Oct. 10, 1967  D. T. SOTO  3,346,269

STAIR CLIMBING HAND TRUCK

Filed Jan. 12, 1966  2 Sheets-Sheet 1

INVENTOR
Dario T. Soto

BY Shoemaker and Mattare

ATTORNEYS

Oct. 10, 1967     D. T. SOTO     3,346,269
STAIR CLIMBING HAND TRUCK
Filed Jan. 12, 1966     2 Sheets-Sheet 2
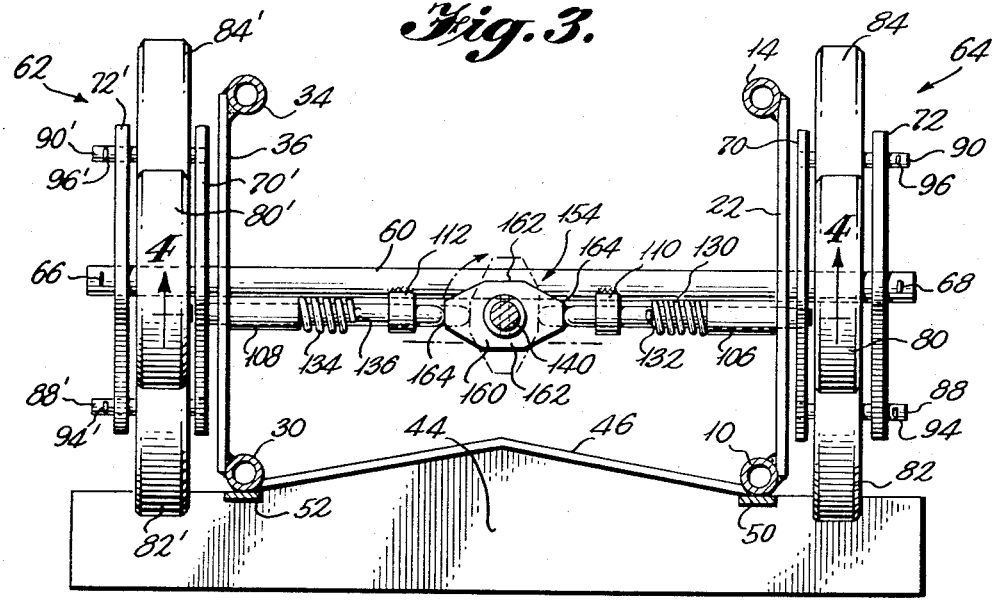
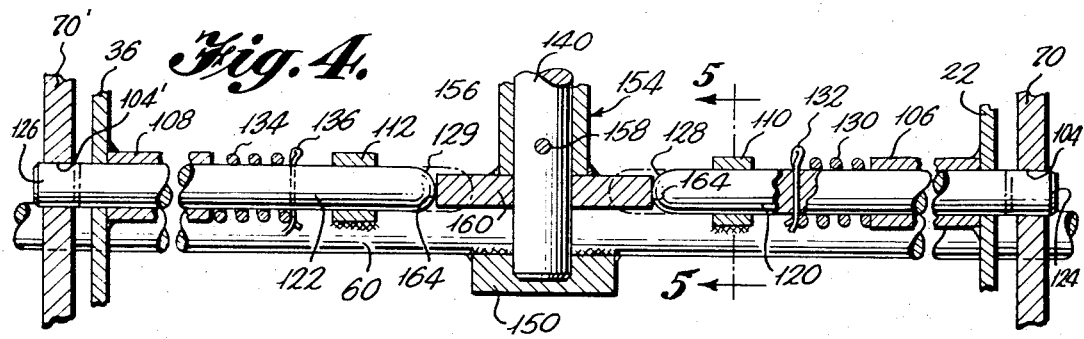
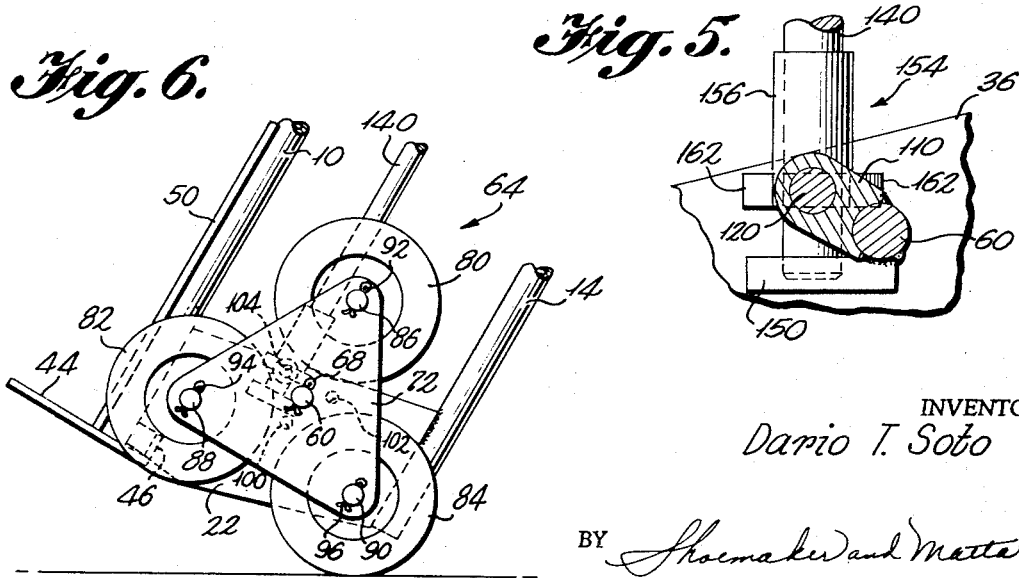
INVENTOR
Dario T. Soto
BY Shoemaker and Mattare
ATTORNEYS United States Patent Office 3,346,269
Patented Oct. 10, 1967

3,346,269
STAIR CLIMBING HAND TRUCK
Dario T. Soto, Gardena, Calif., assignor to Soto Manufacturing and Welding Company, Gardena, Calif., a partnership
Filed Jan. 12, 1966, Ser. No. 520,284
4 Claims. (Cl. 280—5.26)

ABSTRACT OF THE DISCLOSURE

A hand truck of the stair climbing type has frame work including two spaced identical inverted U-shaped frame members carrying spaced pairs of freely rotatable wheel assemblies of three wheels each. Means for locking the wheel assemblies against rotation comprising spring retractable spaced aligned pins contacting holes in the assemblies, and a rotatable cam between and contacting the adjacent ends of said pins and urging them into locking position and a manually rotatable rod for rotating the cam.

---

The present invention relates to a new and novel hand truck, and more particularly to a hand truck of the so-called stair climbing type.

The hand truck of the present invention is especially adapted for use in moving furniture or similar large bulky objects which may be relatively heavy, the hand truck being provided with wheel assemblies which enable the hand truck to be readily moved up and down stairs while loaded.

In this stair climbing type of arrangement, a pair of wheel assemblies are mounted at opposite ends of a transverse axle means provided on the load supporting framework. Each of these wheel assemblies is rotatably supported on the axle means and in turn rotatably supports at least three equally spaced wheels. The arrangement is such that with the wheel assemblies freely rotatably positioned on the axle means, the hand truck may be disposed either in a vertical or rearwardly inclined position while the peripheries of two of the wheels will remain on a suitable supporting surface. With this arrangement, the hand truck may be readily moved over flat surfaces or over obstacles, and in particular is adapted to move up and down steps. The disadvantage of this particular arrangement is that as long as the wheel assemblies are freely rotatably mounted on the axle means, it is very difficult to turn or maneuver the hand truck.

Accordingly, it is desirable to provide a means for converting the hand truck from the four-wheel type of operation as discussed above to a two-wheel operation wherein the hand truck is supported on a suitable supporting surface by only a single wheel of each wheel assembly. When the hand truck is operated in a two-wheel operation, it may be readily turned and maneuvered on level and inclined surfaces.

The arrangement of the present invention is especially adapted to enable the hand truck to be converted from four-wheel operation to two-wheel operation in a very simple and expeditious manner, this being accomplished simply by placing the framework in a predetermined position which automatically aligns the operating means of the invention with the wheel assemblies whereupon it is merely necessary to turn the handle of the control means to positively secure each of the wheel assemblies to the framework to prevent relative rotation between the wheel assemblies and the framework.

When the wheel assemblies are so locked to the framework that they cannot rotate with respect to the associated axle means, the framework can then simply be tilted angularly in a rearward direction thereby lifting the forward wheels of each of the wheel assemblies off of the supporting surface and the hand truck may be moved while supported on a single wheel at each end of the axle means.

An important feature of the arrangement of the present invention is the fact that this conversion either from a four-wheel operation to a two-wheel operation or vice versa may be readily carried out even while the hand truck is heavily loaded, and it does not necessitate excessive movement or manipulation of the hand truck framework while so converting the mechanism.

Another important advantage of the structural features of this invention is the fact that the hand truck can be converted in all relative positions of the wheel assemblies with respect to the framework of the hand truck. In other words, the hand truck can be readily converted regardless of which of the supporting wheels happen to be on the support surface at any particular time.

An object of the present invention is to provide a new and novel hand truck of the stair climbing type which may be converted from a four-wheel operation to a two-wheel operation or vice versa in a simpler and quicker manner than prior art devices.

Another object of the invention is the provision of a hand truck which can be readily converted as discussed above even while heavily loaded.

Still another object of the invention is to provide a hand truck which can be converted as discussed above in all relative positions of the wheel assemblies with respect to the associated framework whereby the hand truck may be converted at any time.

A further object of the invention is the provision of a hand truck of the stair climbing type which is quite simple and inexpensive in construction, and yet which is quite efficient and reliable in use.

Other objects and many attendant advantages of the invention will become more apparent when considered in connection with the specification and accompanying drawings, wherein:

FIG. 3 is a sectional view taken substantially along line 3—3 of FIG. 1 looking in the direction of the arrows;

FIG. 4 is a broken away sectional view taken substantially along line 4—4 of FIG. 3 looking in the direction of the arrows;

FIG. 5 is a sectional view taken substantially along line 5—5 of FIG. 4 looking in the direction of the arrows; and FIG. 6 is a side view illustrating the lower portion of the apparatus and showing the wheel assembly in another operative position.

Figure 1:
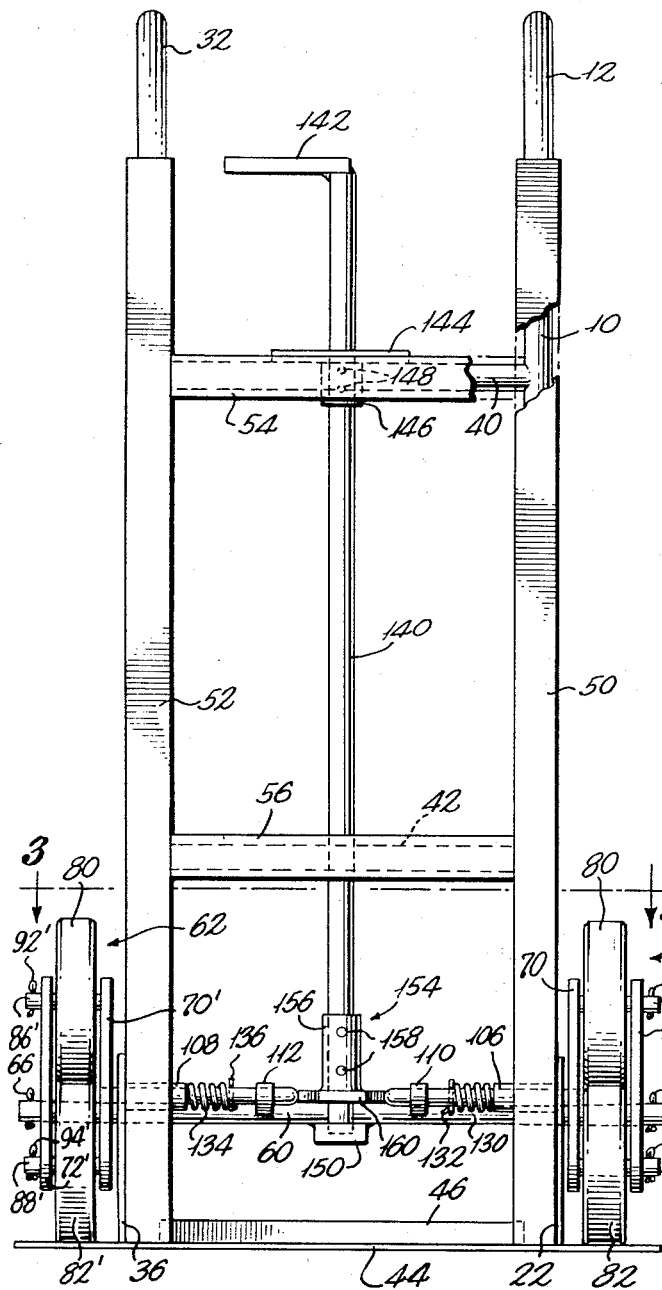
FIG. 1 is an elevation of the hand truck of the present invention with certain portions broken away for the purpose of illustration.

Referring now to the drawings wherein like reference characters designate corresponding parts throughout the several views, the hand truck of the present invention includes an open framework, this open framework including a first tubular member which is bent to form a generally U-shaped configuration, this tubular member as well as the remaining frame members being formed of a suitable rigid metallic substance so as to withstand the loads applied thereto. This first U-shaped member includes an elongated leg portion 10, an intermediate curved portion 12 forming a handle, and a further elongated leg portion 14 disposed substantially parallel with leg portion 10. As seen especially in FIG. 2, the two leg portions 10 and 14 are interconnected with one another by three spaced cross members 16, 18 and 20 which may be of tubular construction and welded at the opposite ends thereof to the leg portions. The lower portions of leg portions 10 and 14 are interconnected by a flat plate 22 having the opposite edges thereof suitably connected as by welding to the leg portions.

A second substantially identical U-shaped member is provided, and as seen in FIGS. 1 and 3 includes a first portion 30 corresponding to portion 10 of the other U-shaped member, an intermediate curved portion 32, and a further portion 34 corresponding to the portion 14 of the other U-shaped member. It will be understood that the two leg portions 30 and 34 of the second U-shaped member are interconnected by three cross members (not shown) similar to members 16, 18 and 20 previously described for rigidifying the structure. The lower ends of the leg portions 30 and 34 are interconnected by a plate 36 similar to plate 22 previously described.

The leg portions 10 and 30 are interconnected with one another by a pair of tubular cross members 40 and 42 having the opposite ends thereof suitably secured as by welding to these leg portions. The leg portions 14 and 34 are also interconnected by a pair of similar tubular members (not shown).

A load supporting flange or portion 44 is secured as by welding to the lower ends of leg portions 10 and 30, and a rear wall portion 46 is provided along the central portion of the rear edge of the load supporting portion 44 and extends vertically upwardly therefrom for a short distance.

Load engaging portions 50 and 52 having flat outwardly facing surfaces are secured to the leg portions 10 and 30 respectively, and load engaging portions 54 and 56 are secured to members 40 and 42 and also present outwardly facing flat surfaces so that the load is adapted to rest against flat surfaces on the hand truck when in the usual supported position.

A transverse axle 60 is provided, this axle extending through suitable holes provided in the plates 22 and 36, the axle being suitably secured to these plates to retain it in operative position. A pair of wheel assemblies are provided, these wheel assemblies being indicated generally by reference numerals 62 and 64, it being noted that the wheel assemblies are supported on opposite end portions of the axle and are retained in operative position by means of cotter pins 66 and 68 respectively extending through suitable holes provided in the axle.

These wheel assemblies are of identical construction, and accordingly, wheel assembly 64 will be described in detail, it being understood that wheel assembly 62 is of similar construction and the corresponding parts of the wheel assembly 62 are provided with the same reference numerals primed as applied to the components of wheel assembly 64.

Referring particularly to wheel assembly 64, this assembly includes a pair of spaced plates 70 and 72, these spaced plates having holes formed through the center thereof receiving the axle so that these plates are freely rotatably supported on the axle. Three spaced wheels 80, 82 and 84 are provided, these wheels being freely and independently rotatably supported upon shafts 86, 88 and 90 respectively, cotter pins 92, 94 and 96 being provided through suitable holes provided in the outer ends of these shafts for retaining the assembly in the operative position shown.

It will be noted that the axes of rotation of the three wheels are so located that each axis is equidistantly spaced from the other two axes. The over-all arrangement is such that when the wheel assemblies are freely rotatably mounted upon the axle for rotation with respect to the framework, two of the wheels will be supported on a suitable supporting surface for enabling the hand truck to be moved along flat surfaces and over obstacles, it being evident that when ascending or descending stairs, for example, the entire wheel assembly including the two plates and the interconnected wheels is adapted to pivot around the axle to permit different ones of the wheels to move into bearing engagement with different ones of the stairs. This mode of operation will be well understood to one skilled in the art.

In order to enable conversion of the hand truck from four-wheel operation to two-wheel operation, means is provided for securing the individual wheel assemblies to the framework so that the wheel assemblies can no longer rotate with respect to the axle. The inner plate 70 of the wheel assembly is provided with three spaced holes 100, 102 and 104 formed therethrough, these holes being so spaced that each hole is equidistantly spaced from the other two holes, the holes being provided intermediate the wheels as seen most clearly in FIGS. 2 and 6 and being so positioned that when the lock members hereinafter described are disposed within the holes, the wheels of the wheel assembly will be in the position shown in FIGS. 2 and 6, or in other words, when the framework is in the vertical position shown in FIG. 2, the lock members are adapted to fit within one of the three holes provided in the inner plate of the associated wheel assembly so that the wheel assembly can be readily locked in the position shown so that the apparatus can be easily converted to a two-wheel operation.

As seen particularly in FIG. 4, guide sleeves 106 and 108 are suitably secured as by welding to the inner faces of plates 22 and 36 respectively. A pair of guide members 110 and 112 are suitably secured as by welding to spaced portions of the axle 60, these guide members 110 and 112 having holes formed therethrough for slidably receiving the lock members 120 and 122 respectively, these lock members also being slidably supported within the guide sleeves 106 and 108. The outer ends 124 and 126 of lock members 120 and 122 respectively are adapted to be snugly received within one of the holes provided in the inner plate of the associated wheel assembly in order to secure the wheel assembly to the framework. The inner ends 128 and 129 of the two lock members are provided with curved cam surfaces for a purpose hereinafter described. A first coil spring 130 is disposed in surrounding relationship to lock member 120, one end of the spring bearing against the inner end of guide sleeve 106, and the opposite end of the spring bearing against a pin 132 extending through a suitable opening provided in lock member 120. Accordingly, spring 130 normally resiliently biases lock member 120 inwardly so that the outer end of the lock member will normally be moved out of interengagement with the holes in the associated wheel assembly.

A similar coil spring 134 is disposed in surrounding relationship to lock member 122, one end of the spring bearing against the inner end of guide sleeve 108, and the opposite end of the spring bearing against a pin 136 extending through a suitable hole provided in lock member 122. It is apparent that spring 134 normally biases lock member 122 inwardly in a manner similar to that of the other lock member.

The control means for controlling the operation of the operating means includes an elongated shaft 140 having a laterally extending handle portion 142 at the upper end disposed in such a position as to be easily manipulated by personnel operating the hand truck. Shaft 140 extends through a suitable hole provided in a plate 144, this plate being supported on the upper portion of cross member 40 between the forward legs of the U-shaped members of the framework and the corresponding cross member between the rear legs of these U-shaped members. A collar 146 is disposed in surrounding relationship to shaft 140 and is held in place by a pair of pins 148 extending through aligned holes in the members, collar 146 engaging the lower surface of plate 144 and being of greater diameter than the hole formed through the plate whereby the collar serves to limit movement of shaft 140 in an upward direction. The lower end of shaft 140 is positioned within a recess provided in a plate 150 suitably secured as by welding to the axle 60. The lower end of shaft 140 may turn freely within the hole provided in plate 150, the plate serving to support the lower end of the shaft and maintain the shaft in proper alignment relative to the other components of the hand truck.

A cam means is indicated generally by reference numeral 154 and includes a tubular portion 156 disposed in surrounding relationship to the lower end portion of shaft 140 and retained in position by means of pins 158 extending through aligned holes provided in the members. The cam means also includes a lower plate-like portion 160 affixed to tubular portion 156, portion 160 as seen most clearly in FIG. 3 being provided with opposite low surfaces 162 and opposite high surfaces 164, the high and low surfaces being disposed at 90 degrees to one another. In the operative position shown in FIG. 3, the high surfaces 164 are in engagement with the inner ends of the lock members so as to urge the lock members outwardly against the force of the associated coil springs and so as to move the outer ends of the lock members into the holes in the plates of the associated wheel assemblies. Rotation of the cam plate 160 into the phantom line position shown in FIG. 3 enables the lock members to move inwardly to the phantom line position shown in this figure whereby the wheel assemblies are no longer secured to the framework and may rotate freely about the axle.

Figure 2:
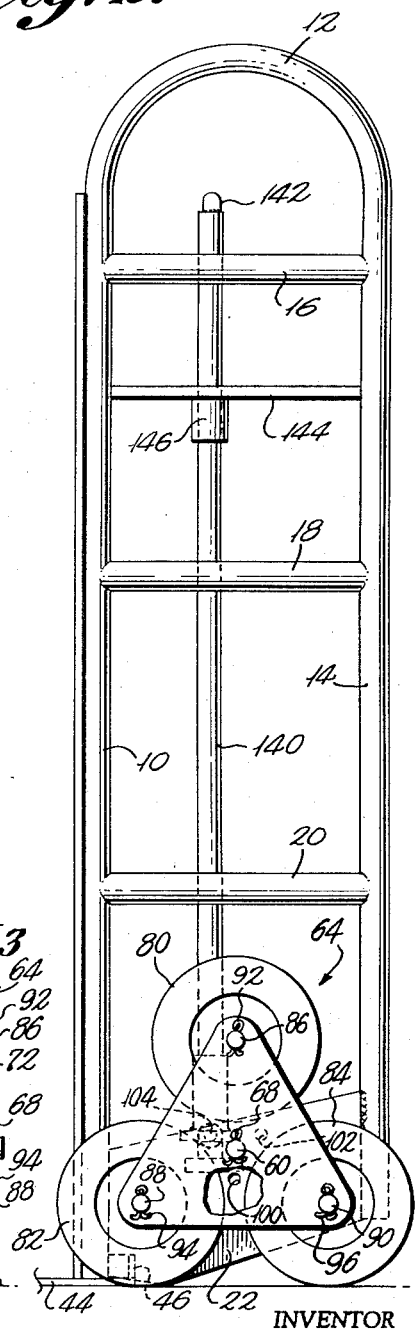
FIG. 2 is a side view of the hand truck shown in FIG. 1 and illustrating the wheel assemblies in a first opeartive position.

In operation, a load is mounted upon the support portion 44, and the framework may be tilted rearwardly into an angular position while the wheel assemblies remain in the position shown in FIG. 2 when the lock members are in their inner position. The hand truck may then be utilized for moving a load either over flat surfaces or inclines and over obstacles such as stairs or the like. When it is then desired to convert the apparatus from four-wheel operation to two-wheel operation, the apparatus is simply moved into the position shown in FIG. 2 wherein the framework is vertical. In this position, the load will of course be supported upon the support portion 44 which is then resting on the support surface. In this position, one of the holes in the inner plates of each of the wheel assemblies will automatically be properly aligned with the associated lock members, and it is then merely necessary to turn handle 142 of the control means so as to cam the lock members outwardly so that the outer ends thereof enter the holes in the inner plates of the wheel assemblies. The wheel assemblies can then no longer rotate with respect to the axle, and accordingly when the hand truck is tilted rearwardly, the wheel assembly will move into the position shown in FIG. 6, and the hand truck is then supported upon one wheel of each wheel assembly.

It is apparent from the foregoing that there is provided according to the present invention a new and novel hand truck of the stair climbing type which may be readily converted from four-wheel operation to two-wheel operation and vice versa in a very simple and expeditious manner. The apparatus can be readily converted even while heavily loaded and may be converted in all relative positions of the wheels with respect to the hand truck when the hand truck is disposed in a predetermined position. The apparatus is quite simple and inexpensive in construction, and yet at the same time is quite efficient and reliable in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A hand truck comprising a framework, handle means at one end thereof, load support portions on said framework at the other end thereof, transverse axle means supported by said framework at said other end, wheel means including a pair of spaced wheel assemblies, said wheel assemblies being journalled at opposite end portions of said transverse axle means, each of said assemblies including support means freely rotatable about the associated end portion of said support means, said three wheels being spaced from one another such that the axis of rotation of each wheel is equally spaced from the axes of rotation of the other wheels, said support means of each of said wheel assemblies including an inner plate having a plurality of holes at least three in number formed therein, each of said holes being equally spaced from other holes, operating means including a pair of lock members carried by said framework, each of said lock members being adapted to fit within the holes of one said wheel assemblies for securing the wheel assemblies to said framework, said lock members being properly aligned with the holes in said wheel assemblies when the framework is in a predetermined position, and manually operable control means for controlling the movement of said lock members into and out of said holes, said last named means comprising a rotatable shaft journaled in said frame and extending medially and longitudinally thereof from a point adjacent said handles to a point adjacent said lock members, a rotatable cam carried by said shaft and engaging the inner ends of said lock members and controlling the movement thereof, and means adjacent said handles for operating said shaft.

2. Apparatus as defined in claim 1, wherein said framework comprises two identical U-shaped frame members secured together in spaced parallel relation, the curved portions of said frame members forming said handles, and plates rigidly securing the free end portions of the legs of the frame members together and forming said supports for said transverse axle.

3. A hand truck comprising a framework load support portions, transverse axle means and wheel means; said framework comprising two identical U-shaped frame members secured together in spaced parallel relation, the curved portions of said frame members forming the handles, and plates rigidly securing the free end portions of the frame members together and forming support means for said axle and wheel means, said wheel assemblies being journaled at opposite end portions of said transverse axle means, each of said assemblies including support means freely rotatable about the associated end portion of said axle means, at least three wheels rotatably supported by each of said support means, said three wheels being spaced from one another such that the axis of rotation of each wheel is equally spaced from the axes of rotation of other wheels, said support means of each of said wheel assemblies including an inner plate having a plurality of holes at least three in number formed therein, each of said holes being equally spaced from other holes, operating means including a pair of lock numbers carried by a said framework, each of said lock members being adapted to fit within the holes of one of said wheel assemblies for securing the wheel assemblies to said framework, said lock members being properly aligned with the holes in said wheel assemblies when said framework is in a predetermined position, and manually operable control means for controlling the movement of said lock members into and out of said holes, said last named means comprising a rotatable shaft journaled in said frame and extending medially and longitudinally thereof from a point adjacent said handles to a point adjacent said lock members, a rotatable cam carried by said shaft and engaging the inner ends of said lock members and controlling the movement thereof, and means adjacent said handles for operating said shaft.

4. Apparatus as defined in claim 3, wherein the inner end of the shaft of the shaft and the inner ends of lock members are received in bearings rigidly connected to said axle.

References Cited

UNITED STATES PATENTS

| 843,034 | 2/1907 | Ridgway | 280—5.26 |
| 2,706,640 | 4/1955 | Marshall | 280—5.26 |
| 2,747,883 | 5/1956 | Frost | 280—5.26 |
| 2,933,323 | 4/1960 | Webber | 280—5.26 |

FOREIGN PATENTS 901,753  1/1954  Germany.

LEO FRIAGLIA, *Primary Examiner.*